United States Patent
Kasper, II

(10) Patent No.: US 7,237,206 B2
(45) Date of Patent: *Jun. 26, 2007

(54) MESSAGE PASSING IN A GRAPHICAL USER INTERFACE

(75) Inventor: David J Kasper, II, Aliso Viejo, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 726 days.

This patent is subject to a terminal disclaimer.

(21) Appl. No.: 10/303,091

(22) Filed: Nov. 21, 2002

(65) Prior Publication Data

US 2004/0100491 A1 May 27, 2004

(51) Int. Cl.
*G06F 3/00* (2006.01)
*G06F 9/00* (2006.01)
*G06F 17/00* (2006.01)
(52) U.S. Cl. .................. 715/805; 715/764; 715/780
(58) Field of Classification Search ............. 715/805
See application file for complete search history.

(56) References Cited

U.S. PATENT DOCUMENTS

| 72,514 | A | * | 12/1867 | Tse et al. ............... 54/38.1 |
| 5,969,705 | A | * | 10/1999 | Fisher et al. ............ 715/764 |
| 6,073,163 | A | * | 6/2000 | Clark et al. ............. 709/203 |
| 6,424,636 | B1 | * | 7/2002 | Seazholtz et al. ........ 370/295 |
| 6,973,600 | B2 | * | 12/2005 | Lau et al. .............. 714/704 |

FOREIGN PATENT DOCUMENTS

WO    WO/0072514    * 11/2000

\* cited by examiner

*Primary Examiner*—Raymond J. Bayerl
*Assistant Examiner*—Sabrina Greene
(74) *Attorney, Agent, or Firm*—Jon M. Powers; Fogg & Powers LLC

(57) ABSTRACT

A graphical user interface element such as a window or a screen is displayed on an output device by sending a single message indicating that the graphical user interface element should be displayed. The message is received, and all the components of the graphical user interface element are displayed. After that, the graphical user interface element can be updated on a component-by-component basis.

16 Claims, 7 Drawing Sheets

MESSAGE PASSING IN A GRAPHICAL USER INTERFACE

TECHNICAL FIELD

The following description relates to the management of a graphical user interface.

BACKGROUND

Software-based systems typically provide some type of user interface by which such a system requests input from a user and by which the system displays output for the user. A user can provide the requested input via an input device such as a keyboard and/or a mouse. The input device is attached to, or is in communication with, the system. The system can display output on an output device such as a computer monitor. The output device is also attached to, or is in communication with, the system.

One type of user interface is a graphical user interface ("GUI"). A GUT typically uses menus and/or other controls to request input from the user and windows and/or screens to display information for the user. A window (or other GUT element such as a screen) is typically constructed from one or more visual components such as text fields, images, scroll bars, and the like. The window is displayed by drawing on the output device each component of the window. Typically, this involves drawing the visible portions of each component. A portion of a component may not be visible, for example, because that portion has scrolled out of the window or has otherwise been hidden from view. The components can be created using, for example, text or bitmapped images. One example of a GUT is found in the WINDOWS 2000(R) operating system from Microsoft Corporation.

Another type of user interface is a command-line interface. A command-line interface typically provides a user with a command prompt at which the user types commands. One example of a command-line interface is the command-line interface used in the Internetworking Operating System found in switches and routers from CISCO Systems, Inc.

One application for a graphical user interface is in embedded systems. For example, a high-speed digital subscriber line 2 (HDSL2) line interface card typically includes an embedded control program. The embedded control program allows a user to use a GUI to view and/or change various operating parameters for the line interface card. In some implementations, the line card includes a craft port (for example, a RS-232 serial port) to which a user physically connects a portable computer or other device in order for the user and the embedded control program to communicate. In some implementations, the embedded control program and the user communicate via an embedded operations channel included in the main HDSL2 data link provided by the line card.

SUMMARY

In general, in one aspect, a method of managing a graphical user interface displayed on an output device includes receiving an input indicating that a graphical user interface element should be displayed, wherein the graphical user interface element has a plurality of components. The method also includes sending a single message that the graphical user interface element should be displayed by displaying each component of the graphical user interface element. The method also includes receiving the message, and, in response to the received message, displaying the graphical user interface element by displaying each component of the graphical user interface element.

In general, in another aspect, a computer program has a storage medium tangibly embodying program instructions managing the display of a graphical user interface on an output device. The program instructions include instructions operable to cause at least one programmable processor to receive an input indicating that a graphical user interface element should be displayed. The graphical user interface element has a plurality of components. The program instructions include instruction operable to cause the programmable processor to send a single message that the graphical user interface element should be displayed by displaying each component of the graphical user interface element. The program instructions also include instructions operable to cause the programmable processor to receive the message, and, in response to the received message, display the graphical user interface element by displaying each component of the graphical user interface element.

In general, in another aspect, a line interface card that includes an upstream interface that sends and receives traffic to an upstream communication link and a downstream interface that sends and receives traffic to a downstream communication link. The line interface card also includes an input-output interface adapted to communicate with a display device and with an input device. The line interface card includes a programmable processor coupled to the upstream interface, the downstream interface, and the input-output interface and a storage medium, coupled to the programmable processor, tangibly embodying program instructions. The program instructions include instructions operable to cause the programmable processor to receive an input indicating that a graphical user interface element should be displayed. The graphical user interface element has a plurality of components. The program instructions also include instructions operable to cause the programmable processor to send a single message that the graphical user interface element should be displayed by displaying each component of the graphical user interface element. The program instructions operable to cause the programmable processor to receive the message, and, in response to the received message, display the graphical user interface element by displaying each component of the graphical user interface element.

Advantages may include one or more of the following. When a graphical user interface element is to be displayed by displaying all the components of the graphical user interface element (for example, when the graphical user interface element is first displayed), a single refresh-all message can be sent. This can be done instead of sending a separate message for each component from which the graphical user interface element is constructed. Sending a single refresh-all message can reduce the amount of processing resources used to display all the components of the graphical user interface element since fewer messages need be sent. Thus, in embodiments where a queue or other message-storage data structure is used for storing such messages, the amount of memory used to implement these data structures can be reduced. In addition, by sending the single refresh-all message, the number of times that messages are written to and read from such a message-storage data structure can be reduced when all the components of the graphical user interface element are displayed. After the graphical user interface element has been displayed, when data used to display a particular component changes, an update-component message associated with that component can be sent. The update-component message indicates that the component associated with the message should be updated and redisplayed. This allows the graphical user interface element to be updated on a component-by-component basis as changes occur to the data used to display the various components. In other words, only those components having changed component data need be updated and redisplayed, which can reduce the amount of processing resources used to update the graphical user interface element. Implementations of such an approach are suitable for use in embedded applications where it is desirable to limit the amount of processing resources used for GUI management.

The details of one or more embodiments of the claimed invention are set forth in the accompanying drawings and description below. Other features, objects, and advantages of the claimed invention will be apparent from the description and drawings, and from the claims.

DRAWINGS

DETAILED DESCRIPTION

Figure 1:
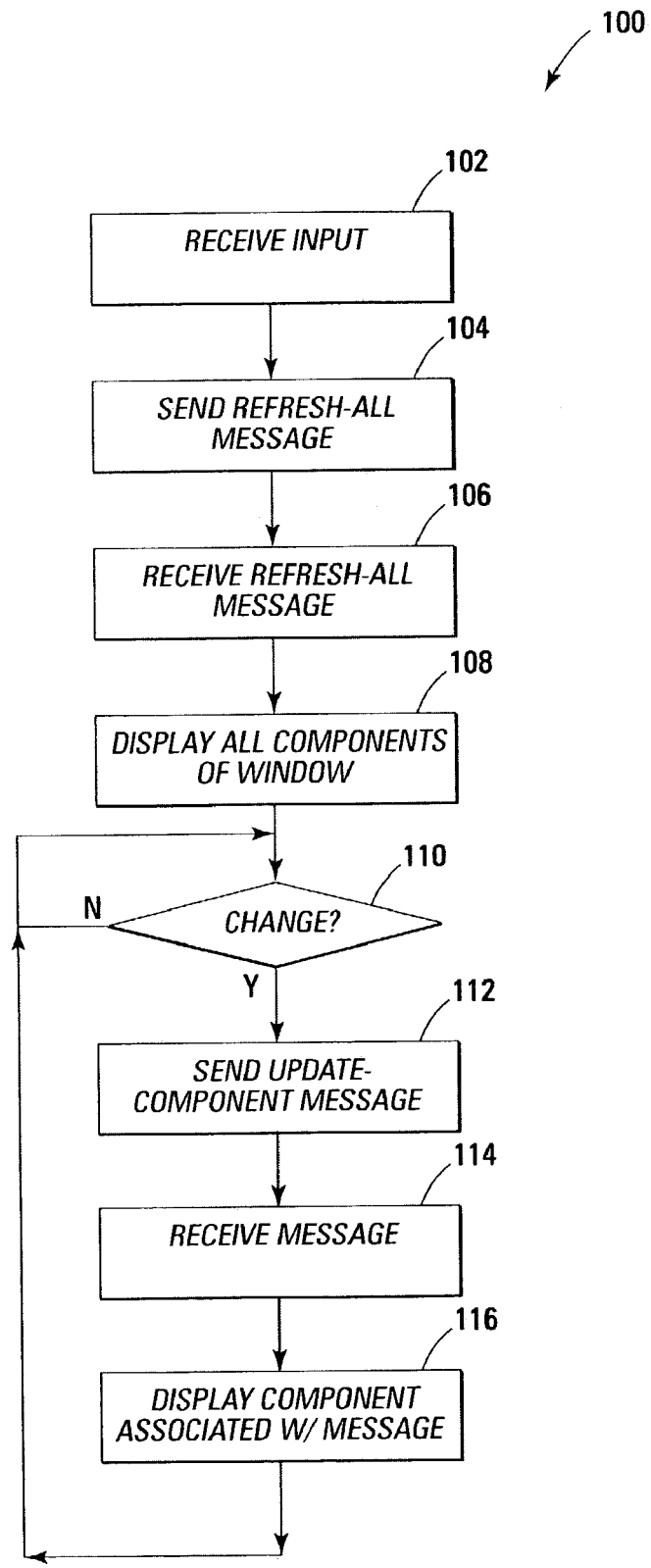
FIG. 1 is a flow diagram of one embodiment of a method of managing a graphical user interface.

FIG. 1 is a flow diagram of one embodiment of a method 100 of managing a graphical user interface. Method 100 includes receiving an input indicating that a GUI window should be displayed on an output device (block 102). Although the following description refers to a window, other GUI elements can be used such as a screen. The window includes a plurality of components from which the window is constructed. When the window is displayed, each component is displayed on the output device. A component is displayed on the output device, for example, by displaying the visible portions, if any, of each component on the output device. The components can include, for example, forms, text fields, controls, or images. For example, the window can include text fields displaying the status of the system with which the GUI is associated. Each component is typically displayed using certain data (the "component data"). The component data can include, for example, data indicating where a particular component should be displayed on the output device and data that indicates what information should be displayed by the component.

Inputs that indicate that a window should be displayed can come from a user (for example, in the form of keyboard or mouse input) and/or from a system associated with the GUI. For example, in one embodiment, a user can use a keyboard or pointing device to select a menu item. The selection is an input that indicates that a window containing system information should be displayed. An example of an input coming from the system is an alarm input indicating that an alarm condition exists. The alarm input indicates that a window notifying the user about the alarm condition should be displayed.

Method 100 also includes sending a single "refresh-all" message indicating that the window should be displayed by displaying each component of the window (block 104). Next, the single refresh-all message is received (block 106) and, in response to the received refresh-all message, the window is displayed by displaying each component of the window (block 108). For each component from which the window is constructed, the current values of any component data for that component are accessed and the component is displayed on the output device.

After the window has been displayed, method 100 checks if component data used to display a component on the output device has changed (block 110). If there has been no such change, method 100 continues to check for such a change (looping back to 110). If such a change has occurred, then an update-component message is sent (block 112). The update-component message is associated with the component having changed component data. Then, the update-component message is received (block 114), and the component associated with the received update-component message is displayed on the output device (block 116). For example, the visible portions, if any, of the component are displayed on the output device using the component data (including the changed component data). A separate update-component message is sent for each component that has changed component data (by looping back to block 110).

When a window is to be displayed by displaying all the components of the window (for example, when the window is first displayed), a single refresh-all message can be sent. This can be done instead of sending a separate message for each component from which the window is constructed. Sending a single refresh-all message can reduce the amount of processing resources used to display all the components of the window since fewer messages need be sent. Thus, in embodiments where a queue or other message-storage data structure is used for storing such messages, the amount of memory used to implement these data structures can be reduced. In addition, by sending the single refresh-all message, the number of times that messages are written to and read from such a message-storage data structure can be reduced when all the components of the window are displayed. After the window has been displayed, when component data for a particular component changes, an update-component message associated with that component can be sent. The update-component message indicates that the component associated with the message should be updated and redisplayed. This allows the window to be updated on a component-by-component basis as changes occur to component data. In other words, only those components having changed component data need be updated and redisplayed, which can reduce the amount of processing resources used to update the window. Implementations of such an approach are suitable for use in embedded applications where it is desirable to limit the amount of processing resources used for GUI management.

Figure 2:
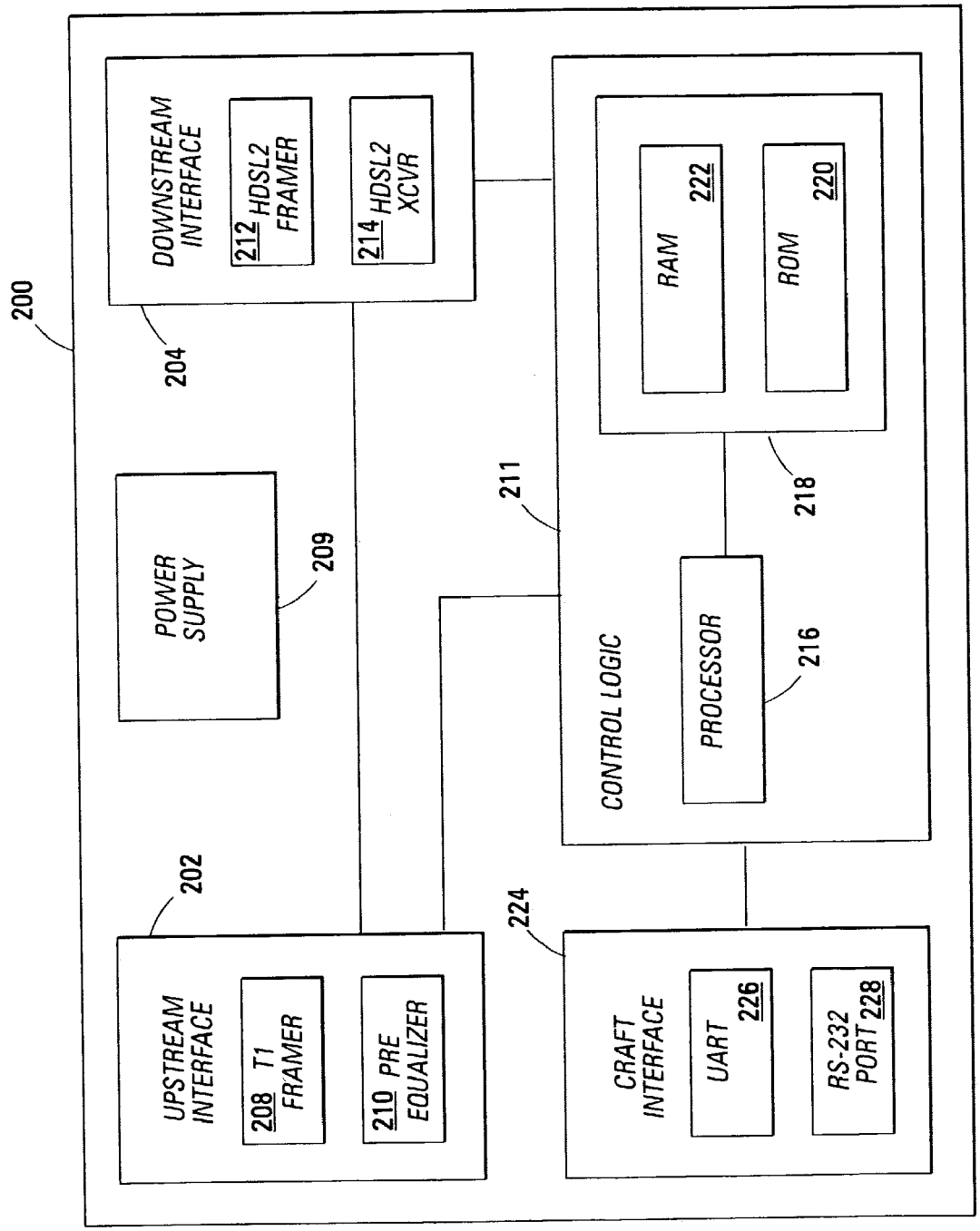
FIG. 2 is a block diagram of one embodiment of an HDSL line interface card.

FIG. 2 is a block diagram of one embodiment of an HDSL line interface card ("line card") 200 that can be used to implement the methods and systems described here. Line interface card 200 is used to send and receive DS1 traffic over an HDSL2 communication link using a single twisted-pair telephone line. The line card 200 includes an upstream interface 202 and a downstream interface 204. Upstream interface 202 and downstream interface 204 couple the line interface card 200 to an upstream link and a downstream link, respectively. In the embodiment shown in FIG. 2, the upstream link is a DSX-1 link that is cross-connected to a time division-multiplexing network. The upstream interface 202 couples the line card 200 to the DSX-1 link and includes, for example, a T1 framer 208 DSX-1 pre-equalizer 210. The downstream link is an HDSL2 link. The downstream interface 204 couples the line card 200 to the HDSL2 link and includes, for example, an HDSL2 framer 212 and an HDSL2 transceiver 214.

The line card 200 includes a power supply 209 for providing power to the components of the line card 200. The line card 200 also includes control logic 211. Control logic 211 includes a programmable processor 216 and a memory 218. Memory 218 includes both read-only memory ("ROM") 220 and random access memory ("RAM") 222. In addition, the line card 200 includes a craft interface 224. Craft interface 224 includes, for example, a universal asynchronous receiver-transmitter ("UART") 226 that couples an RS-232 serial port 228 to the processor 216.

A user can connect a portable computer or other data terminal to the serial port 228 and communicate with an embedded control program executing on the programmable processor 216. In one embodiment, the embedded control program allows the user to view and change system settings and view system performance, history, alarm, and inventory data. Alternatively, the user can communicate with the embedded control program over an embedded operations channel carried among the DS1 traffic handled by the line card 200. In either case, the embedded control program includes a process to manage a user interface such as described with respect to one or more of FIG. 1, above, and FIGS. 4, 5A, 5B, and 5C, below. Although FIG. 2 depicts an HDSL2 line interface card, other telecommunications devices can be used to implement the techniques described here. For example, G.SHDSL, HDSL, HDSL4, asynchronous digital subscriber line (ADSL), plain old telephone service (POTS), integrated services digital network (ISDN), and cable-modem line interface cards can be used.

Figure 3:
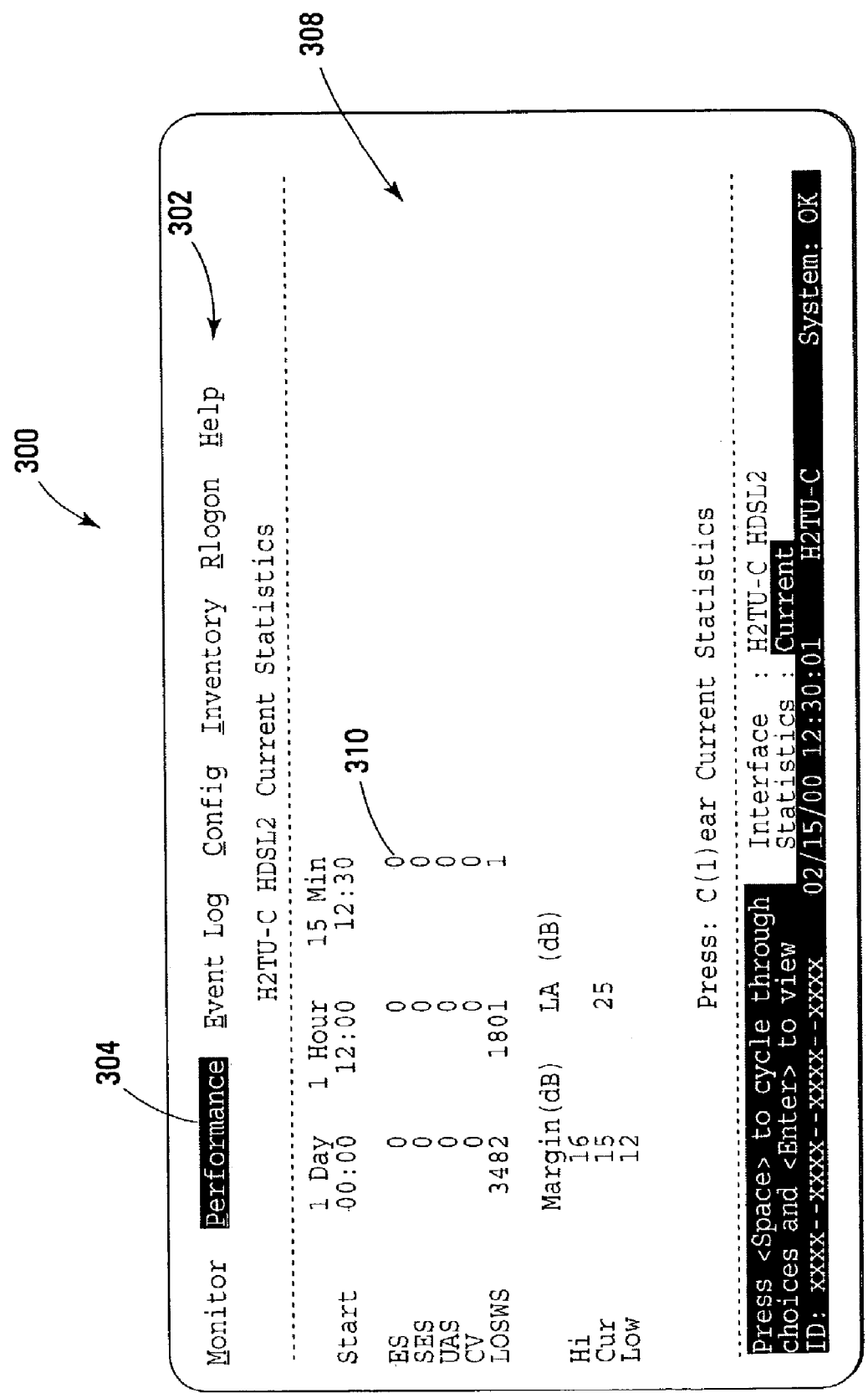
FIG. 3 is a schematic diagram of an exemplary graphical user interface.

FIG. 3 is a schematic diagram of an exemplary graphical user interface 300 that can be used with an embedded control program executing on line card 200. GUI 300 is provided by way of example and not by way of limitation. In other embodiments, other user interfaces that include windows or screens with one or more visual components such as text fields, images, scroll bars, and the like are managed using embodiments of the methods and techniques described here. The embedded control program includes one or more processes to manage GUI 300 such as the processes of FIGS. 1, 4, 5A, 5B, and 5C. In the example of FIG. 3, GUI 300 includes a menu bar 302 having several menu items 304 that a user can select, for example, using arrow keys to highlight a menu item 304 (for example, the PERFORMANCE menu item 304 is highlighted in FIG. 3) and then pressing the ENTER key to select the item. The GUI 300 also includes a window 308 in which various GUI components are displayed. For example, as shown in FIG. 3, various text fields 310 are displayed in the window 308. The text fields 310 display various performance data about the line card 200.

Figure 4:
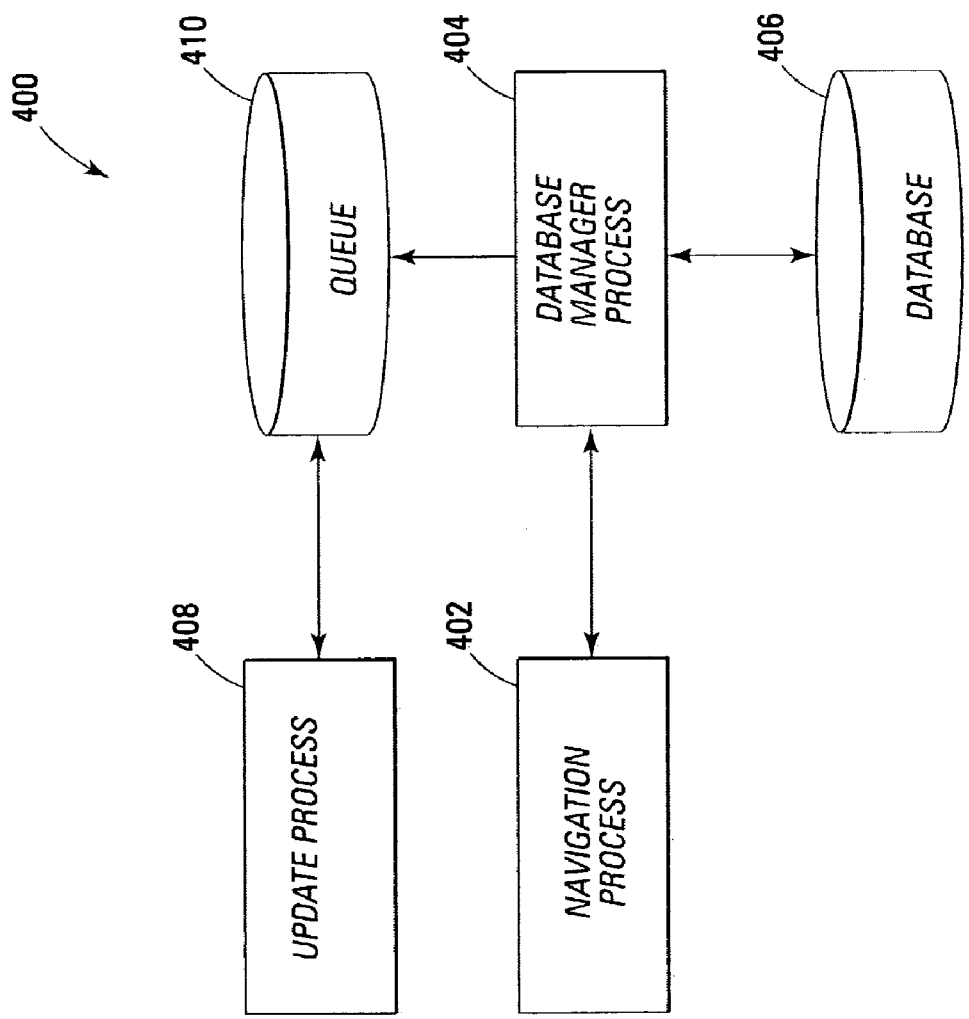
FIG. 4 is a block diagram of one embodiment of a program that manages a graphical user interface.

FIG. 4 is a block diagram of a program 400 that manages a GUI. Program 400 is one embodiment of method 100 and can be implemented as an embodiment of an embedded control program. In such an embodiment, the program 400 can manage, for example, the GUI 300 shown in FIG. 3. Program 400 includes a navigation process 402 that receives and processes navigation-related input from a user. For example, in an embodiment executed on the line card 200, the user can connect a portable computer or other data terminal to the serial port 228. Alternatively, the user can communicate with the program 400 via an embedded operations channel.

Navigation-related input includes keyboard presses and/or input from a pointing device such as a mouse. One type of input received by navigation process 402 is an input that indicates that a window should be displayed on the output device. For example, in an embodiment implementing GUI 300 shown in FIG. 3, a user can use a keyboard to select the PERFORMANCE menu item 304, which causes the program 400 to display a window 308 containing text fields 310 in which system information is displayed. The window 308 is displayed by displaying on the output device the visible portions, if any, of all the components from which the window 308 is constructed.

Program 400 also includes a database manager process 404, which maintains a database 406 in which system data is stored. In an embodiment implementing GUI 300, the system data is performance and configuration data for the line card 200. When the navigation process 402 receives an input indicating that a window should be displayed, the navigation process 402 communicates to the database manager process 404 what data is used to display the window. The navigation process 402 can, for example, send a message to the database manager process 404 that contains a pointer or other reference to component data used to display the components from which the window is constructed. In response, the database manager process 404 saves the pointer or other reference to the component data in the database 406 and sends a refresh-all message to an update process 408. The refresh-all message indicates that the update process 408 should display each component of the window. The update process 408 receives the message and then displays the window by displaying each component of the window on the output device (for example, by displaying on the output device the visible portions, if any, of each component of the window).

After that, the database manager 404 can detect when data used to display one or more of the window's components changes. The database manager 404 sends a separate update-component message to the update process 408 for each component having a change to the data used to draw that component. For each update-component message, the update process 408 receives the update-component message and updates the window by redisplaying the component on the output device (for example, by displaying the visible portions of the component associated with the message). The component is displayed using the changed component data.

The database manager process 404 sends a message to the update process 408 by writing the message into a queue 410. The update process 408 reads messages from the queue 410. Program 400 is typically implemented in software and/or firmware stored in read-only memory (ROM) and/or random access memory (RAM) and is executed on at least one programmable processor. For example, in one embodiment implemented using line card 200, program 400 can be implemented in firmware stored in ROM 220 and is executed on programmable processor 216.

Figure 5A:
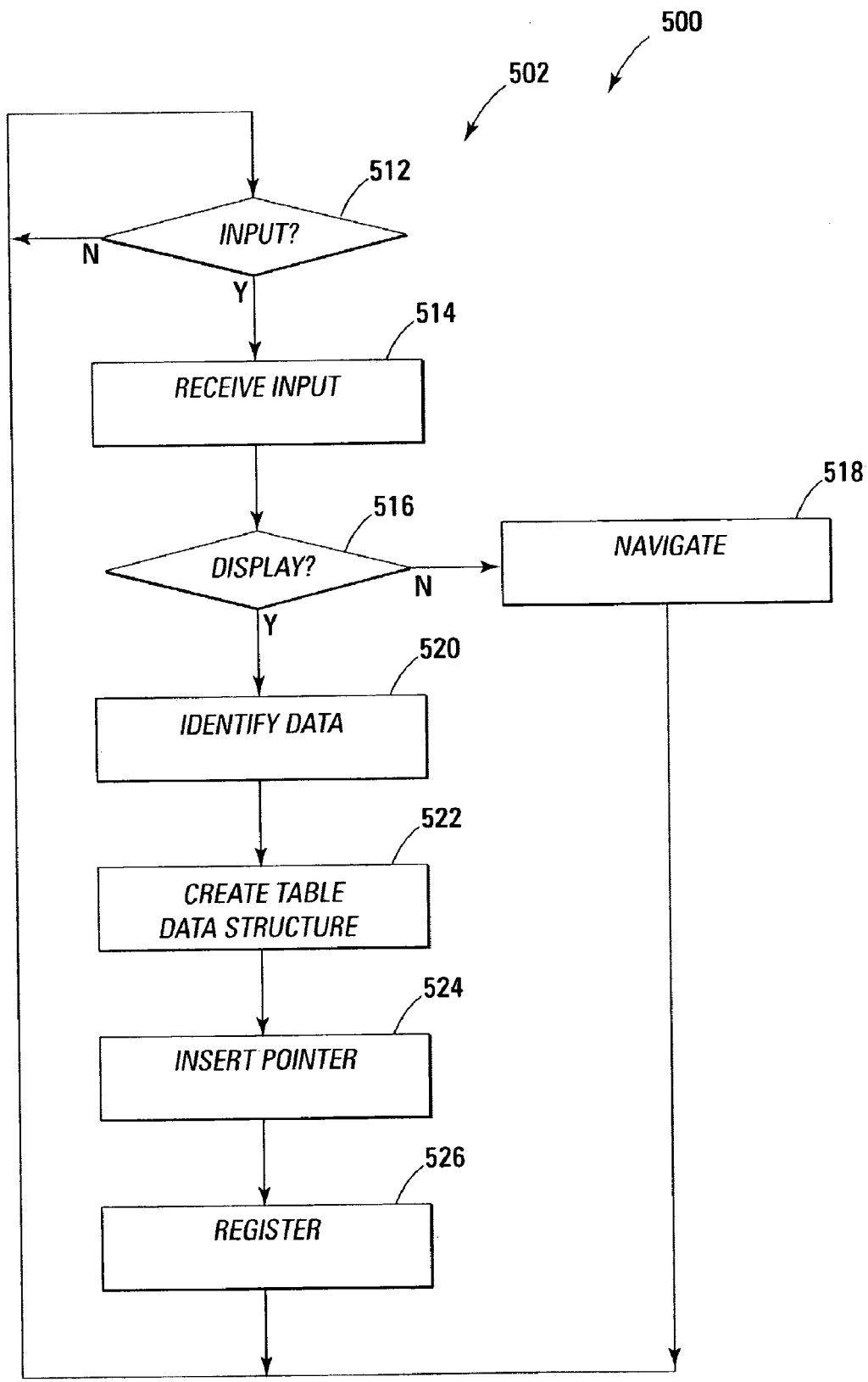
FIGS. 5A–5C are flow diagrams of one embodiment of a method of managing a graphical user interface.
Figure 5B:
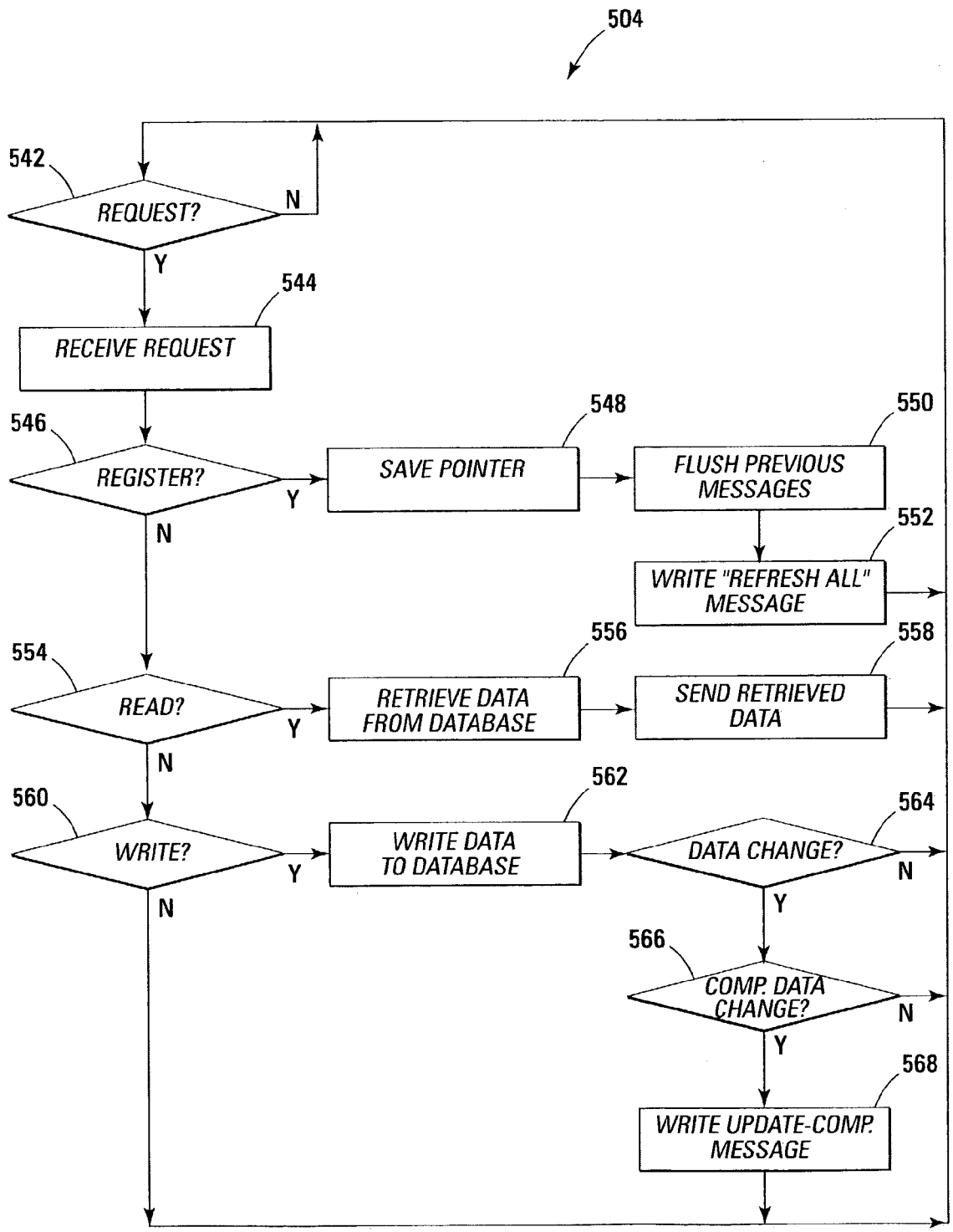
Figure 5C:
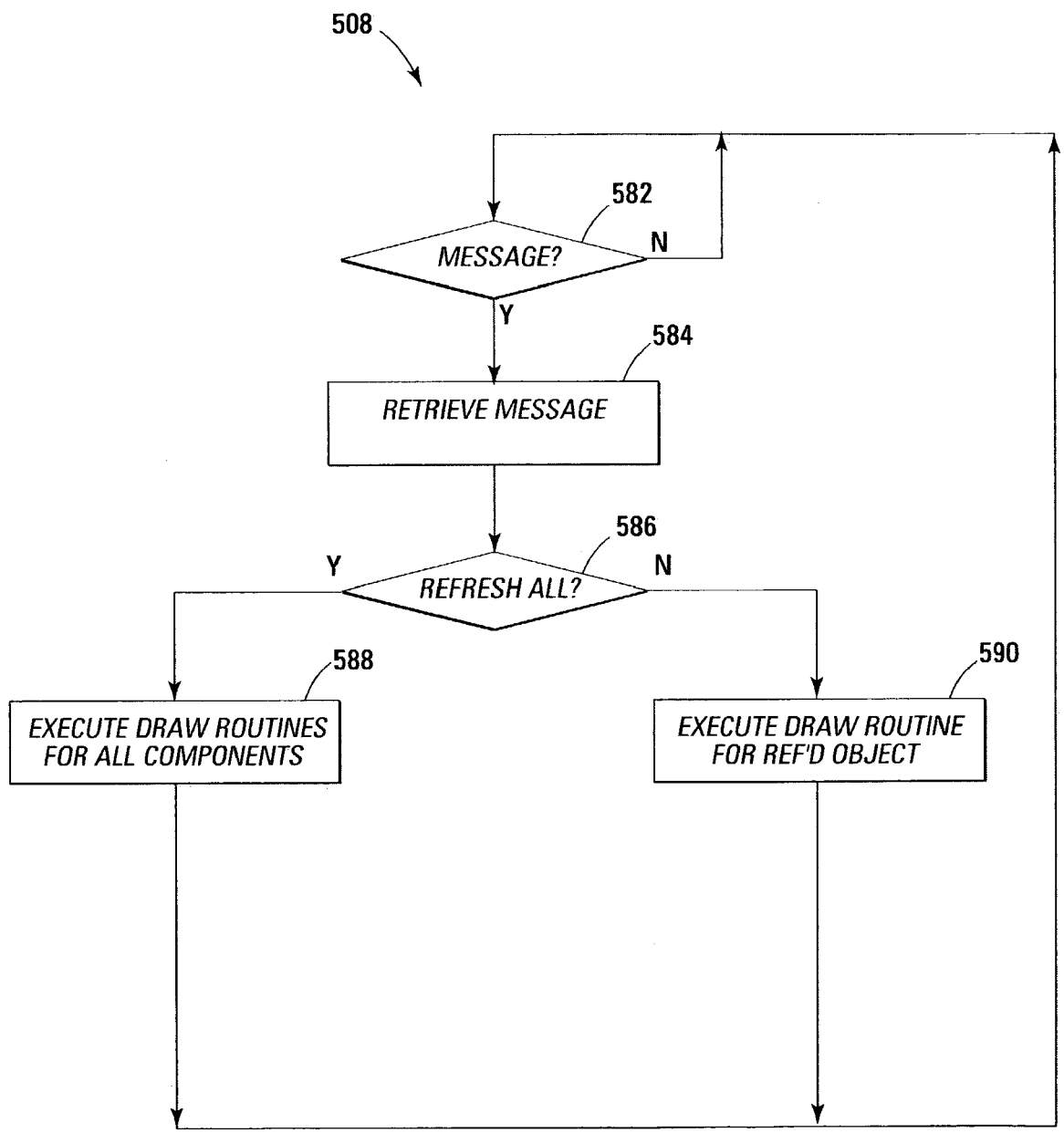

FIGS. 5A–5C are flow diagrams of a method 500 of managing a GUI. Method 500 is one implementation of the program 400 shown in FIG. 4. Method 500 includes a navigation process 502 shown in FIG. 5A, a database manager process 504 shown in FIG. 5B, and an update process 508 shown in FIG. 5C. If there is input (checked in block 512), the input is received (block 514). The input can come from a user (via an input device such as a keyboard or mouse) and/or can come from the system associated with the GUI. Next, it is determined if the input indicates that a particular window should be displayed (block 516). If the input does not indicate that a particular window should be displayed, then other navigation-related processing is performed (block 518). For example, a cursor can be moved or an edit to an editable text field can be received.

If the input indicates that a particular window should be displayed, then the process 502 identifies what data is required to display the window (block 520). In this embodiment, a window has one or more components from which the window is constructed. The components can be, for example, text fields, images, user controls such as a scroll bars, menus, etc. Each component from which the window is constructed has at least one object associated with that component. An object is a data structure containing data and one or more routines. Each object has a routine that draws the component associated with that object on the output device (the "draw routine"). The window is displayed by executing the draw routine for each component of the window. The draw routine accesses any data used to display the component. For example, this data can be stored within the object itself and/or the draw routine can retrieve the data from another source, for example, the database 406.

The navigation process 502 creates a table data structure (block 522) and inserts into the table a pointer or other reference to each of the objects required to display the window (block 524). The navigation process 502 then registers the table with the database manager process 504 (block 526). As a part of registering the table, the navigation process 502 passes to the database manager process 504 a pointer or other reference to the table.

The database manager process 504, shown in FIG. 5B, determines if a request to access the database 406 has been made (block 542). If a request has been made, the database manager process 504 receives the request (block 544). Otherwise, the database manager process 504 continues to check if a request has been made by looping back to block 542. Several different types of requests can be made. If the request was a request to register a table (checked in block 546), the database manager process 504 saves the pointer or other reference to the table in the database 406 (block 548). The database manager process 504 then flushes the queue 410 (block 550) and sends a refresh-all message to the update process 508 (block 552). Flushing the queue 410 removes any previous messages from the queue 410. The refresh-all message indicates that the update process 508 should display the window by displaying all of the window's components. The database manager process 504 then checks for additional requests (looping back to block 542).

If a request to read data from the database 406 (a "read request") is received (checked in block 554), the database manager process 504 retrieves the requested data from the database (block 556) and sends the received data to the requesting object (block 558). For example, as described below, when the update process 508 displays a component of the window, the update process 508 executes the draw routine for the object associated with that component. The draw routine can send a read request to the database manager process 504 requesting a particular item of data from the database 406. For example, in one embodiment executed on line card 200, configuration and performance data for the line card 200 can be stored in the database 406.

If a request to write data to the database 406 (a "write request") is received (checked in block 560), the database manager process 504 writes the data to the database 406 (block 562). For example, the request can specify a particular target record or object stored in the database 406 for the write operation, along with the data to be written. In one embodiment, a request to write data to the database 406 can come from a monitor process (not shown) that monitors various operational parameters of the line card 200. For example, the monitor process can periodically check those operational parameters. When a monitored operational parameter changes, the monitor process sends a write request to the database manager process 504 requesting that a new value for the operational parameter be written into the database 406. Also, the write request can come from the navigation process 502, for example, when a user uses the GUI to change a parameter or other data item displayed by the GUI.

The database manager process 504 then determines if the write request resulted in a change to the data stored in the database 406 (block 564). For example, the data specified in the write request may be the same data that is already stored in the target record or object. In this case, there is no change to the data stored in the database 406. If there has been a change, the database process manager 504 determines if the write request changed any component data used to display the components of the window (checked in block 566).

The database manager process 504, for example, goes through the saved object table to determine if any of the objects referenced by the table uses any data changed by the write request. This determination can be performed, for example, by executing a special routine included in the object. The special routine identifies what data is used by that object to display its associated component. If any data used to display a particular component was changed by the write request, an update-component message instructing the update process 508 to update the component is written to the queue 410 (block 568). For example, for each component that has component data changed by the write request, the database manager process 504 can write an update-component message to the queue 410 containing a pointer or other reference to that component's object. The update process 508, as described below, uses the messages to update and redisplay the component by executing the referenced object's draw routine.

When one or more messages are waiting in the queue (checked in block 582 shown in FIG. 5C), the update process 508 retrieves a message from the queue (block 584). If the message is a refresh-all message (checked in blocked 586), the update process 508 executes the draw routine for each component used to display the window (block 588). The refresh-all message can include a pointer or other reference to the object table. The update process 508 then executes the draw routines for all of the objects referenced in the object table in order to display the window on the output device. Each component's draw routine accesses any data needed to draw the component and, then, draws the component on the output device. The update process 508 then checks if any other messages are waiting in the queue 410 (looping back to block 582).

If the request is not a refresh-all message and is instead an update-component message, the update process 508 executes the draw routine for any object referenced by the message (block 590). The message can include a pointer or other reference to the object, which the update process 508 uses to execute that object's draw routine. The object's draw routine updates the component by accessing the data used to display the component (including any data that has changed). For example, this data can be stored within the object itself and/or the draw routine can retrieve the data from another source, for example, the database 406. The draw routine redraws the component on the output device. The update process 508 then checks if any other messages are waiting in the queue 410 (looping back to block 582).

The methods and techniques described here may be implemented in digital electronic circuitry, or with a programmable processor (for example, a special-purpose processor or a general-purpose process such as a computer)

firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A line interface card, comprising:
    an upstream interface that sends and receives traffic to an upstream communication link;
    a downstream interface that sends and receives traffic to a downstream communication link;
    an input-output interface adapted to communicate with a display device and with an input device;
    a programmable processor coupled to the upstream interface, the downstream interface, and the input-output interface;
    a storage medium, coupled to the programmable processor, tangibly embodying program instructions;
    wherein the program instructions includes instructions operable to cause the programmable processor to:
        receive an input indicating that a graphical user interface element should be displayed, wherein the graphical user interface element has a plurality of components;
        send a single first message that the graphical user interface element should be displayed by displaying each component of the graphical user interface element;
        in response to the first message, display the graphical user interface element by displaying each component of the graphical user interface element;
        after displaying the graphical user interface element by display each component of the graphical user interface element, send a second message if data used to display one of the plurality of components of the graphical user interface element changes, wherein the second message is associated with the one of the plurality of components of the graphical user interface element; and
        in response to the second message, display the one of the plurality of components of the graphical user interface element associated with the second message;
    wherein the upstream communication link is a DSX-1 link and the upstream interface includes:
        a T1 framer in communication with the downstream interface and adapted to communicate with the DSX-1 link; and
        a pre-equalizer coupled to the T1 framer and the downstream interface and adapted to communicate with the DSX-1 link.

2. The line interface card of claim 1, wherein the program instructions further include program instructions operable to cause the programmable processor to:
    identify what data is used to display each component of the graphical user interface element; and
    create a data structure that refers to the data used to display each component of the graphical user interface element.

3. The line interface card of claim 2, wherein the program instructions operable to cause the programmable processor to receive the input indicating that the graphical user interface element should be displayed, identify what data is used to display each component of the graphical user interface element, and create the data structure that refers to the data used to display each component of the graphical user interface element are executed in a first process.

4. The line interface card of claim 3, wherein the first process comprises a navigation process.

5. The line interface card of claim 2, wherein the program instructions operable to cause the programmable processor to send the single first message that the graphical user interface element should be displayed by displaying each component of the graphical user interface element and send the second message if the data used to display one of the plurality of components of the graphical user interface element changes are executed in a second process.

6. The line interface card of claim 5, wherein the second process comprises a database manager process having a database associated therewith.

7. The line interface card of claim 2, wherein the program instructions operable to cause the programmable processor to, in response to the first message, display the graphical user interface element by displaying each component of the graphical user interface element and, in response to the second message, display the one of the plurality of components of the graphical user interface element associated with the second message are executed in a third process.

8. The line interface card of claim 7, wherein the third process comprises an update process.

9. The line interface card of claim 1, wherein each component of the graphical user interface element has an object associated therewith, and the data structure comprises a table that includes a table entry for each component of the graphical user interface element that references the object associated with the component.

10. The line interface card of claim 9, wherein each object references data used to display the component associated with that object.

11. The line interface card of claim 9, wherein each object includes a draw routine that displays the component associated with that object.

12. The line interface card of claim 1, wherein the program instructions operable to cause the programmable processor to send the single first message that the graphical user interface element should be displayed include program instructions operable to cause the programmable processor to write the first message to a queue.

13. The line interface card of claim 12, wherein the program instructions operable to cause the programmable processor to receive the first message include program instructions operable to cause the programmable processor to read the first message from the queue.

14. The line interface card of claim 1, wherein the input includes at least one keyboard press.

15. The line interface card of claim 1, wherein the downstream communication link is an HDSL2 link and the downstream interface includes:
   an HDSL2 framer in communication with the upstream interface and adapted to communicate with the HDSL2 link; and
   an HDSL2 transceiver coupled to the HDSL2 framer and adapted to communicate with the HDSL2 link.

16. A line interface card, comprising:
   an upstream interface that sends and receives traffic to an upstream communication link;
   a downstream interface that sends and receives traffic to a downstream communication link;
   an input-output interface adapted to communicate with a display device and with an input device;
   a programmable processor coupled to the upstream interface, the downstream interface, and the input-output interface;
   a storage medium, coupled to the programmable processor, tangibly embodying program instructions;
   wherein the program instructions includes instructions operable to cause the programmable processor to:
   receive an input indicating that a graphical user interface element should be displayed, wherein the graphical user interface element has a plurality of components;
   send a single first message that the graphical user interface element should be displayed by displaying each component of the graphical user interface element;
   in response to the first message, display the graphical user interface element by displaying each component of the graphical user interface element;
   after displaying the graphical user interface element by display each component of the graphical user interface element, send a second message if data used to display one of the plurality of components of the graphical user interface element changes, wherein the second message is associated with the one of the plurality of components of the graphical user interface element; and
   in response to the second message, display the one of the plurality of components of the graphical user interface element associated with the second message;
   wherein the downstream communication link is an HDSL2 link and the downstream interface includes:
   an HDSL2 framer in communication with the upstream interface and adapted to communicate with the HDSL2 link; and
   an HDSL2 transceiver coupled to the HDSL2 framer and adapted to communicate with the HDSL2 link.

* * * * *